Feb. 11, 1964   W. C. WALKER   3,120,755
PICK TESTING APPARATUS
Filed Aug. 18, 1961
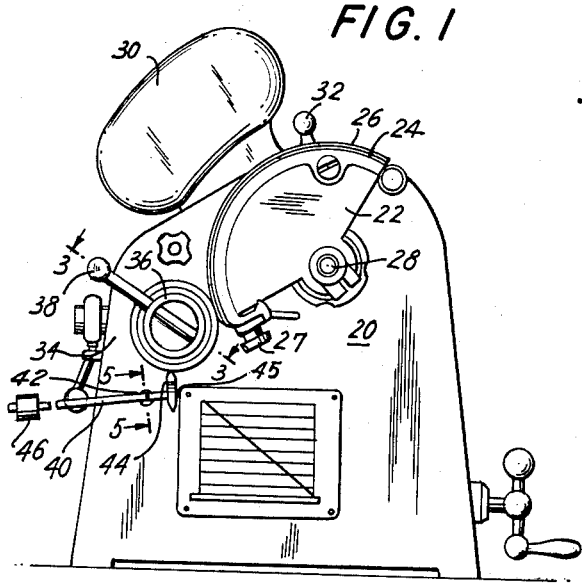
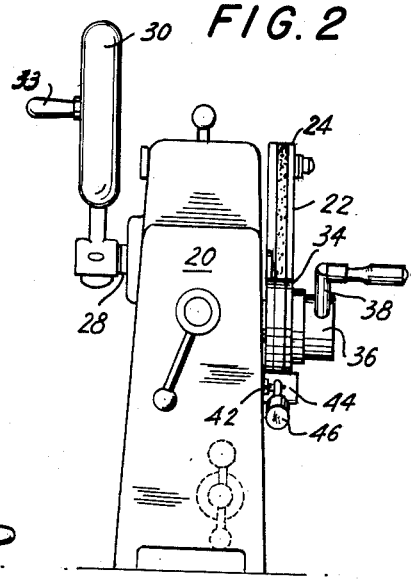
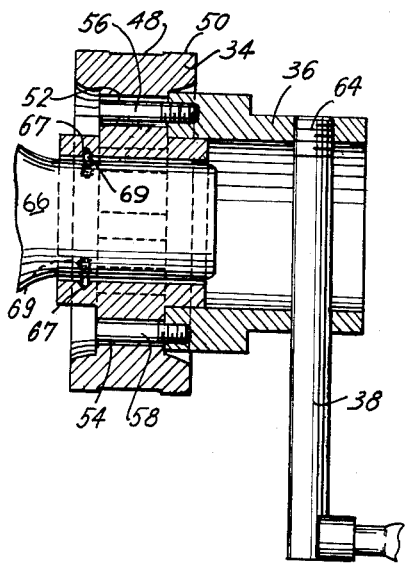
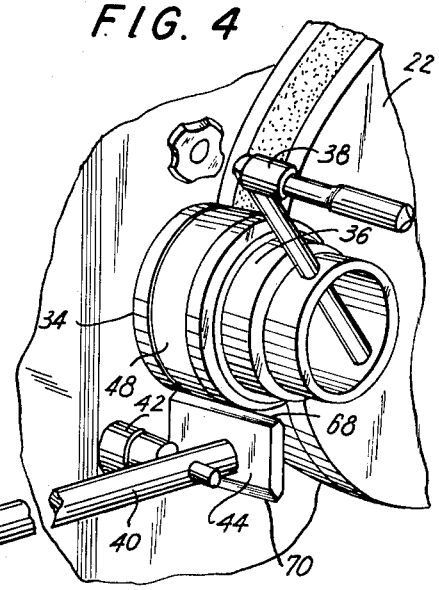
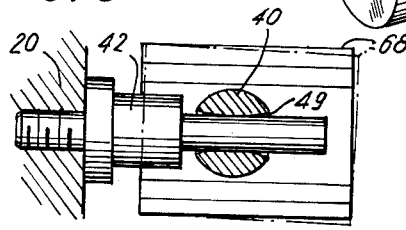
INVENTOR.
WILLIAM C. WALKER
BY 3,120,755
PICK TESTING APPARATUS
William C. Walker, Williamsburg, Pa., assignor to West Virginia Pulp and Paper Company, New York, N.Y., a corporation of Delaware
Filed Aug. 18, 1961, Ser. No. 133,018
2 Claims. (Cl. 73—150)

This invention relates to pick testing instruments and more specifically to a pick testing instrument having an improved inking assembly.

Picking is the pull exerted by an inked surface upon the surface being printed and is explained in detail in the U.S. Patent to Pomper, 2,705,424. With uncoated papers picking is measured as the resistance of the individual fibers in the sheet from being pulled off the surface of the sheet by adhesion to an inked printing surface, whereas with coated papers the resistance of the fibers and the coating to be pulled is also measured. A paper that is easily picked requires a low printing speed and will produce poor quality work.

The measurement or estimation of the pick resistance of paper has been an important problem in the quality control of printing papers. From the measurement point of view there are two types of picking. The first involves a very small percentage of the paper surface and is due to failure in generally dispersed areas on account of scattered defects caused by inclusions or foreign bodies. This type of picking is of particular importance in offset printing where picks are often cumulative in their effect. Testing for this type of picking requires examination of large areas and is most satisfactorily done by actual offset printing of several hundred sheets.

The second type of picking is a more general failure of the sheet or coating and is more directly related to the actual strength of the sheet. Resistance to this type of picking can be checked in small areas and is often referred to as the "surface strength" of the paper. It is this second type of picking to which this invention relates.

The Dennison wax test has been used for many years for the measurement of the surface strength of paper to give an indication of whether it might give picking trouble on printing presses. It has been recognized for some time, however, that the wax test is quite inadequate for the prediction of picking behavior, and more reliable methods have been sought. As a result, a number of new instruments have appeared for the testing of the pick resistance of paper by actual simulation of the printing process. These instruments differ basically in their action and can best be discussed in three groups.

The first group is essentially a mechanization of the wax test using the tack graded inks in place of the graded waxes. In this group the ink in a thin film is pressed against the paper surface and pulled away in a manner somewhat similar to the wax test. It does give a fair simulation of printing conditions as far as pressure, timing, and materials are concerned. The endpoint indicating the surface strength is found by testing the paper with various tack-graded inks to find the one of highest tack that the paper will withstand. There is no distinction made between the directions on the paper surface.

The second group has rotary or flatbed printing action to give better simulation of the letterpress printing process. They print the paper at constant speed with one of the tack-graded inks. The speed is adjusted for succeeding tests until the critical speed at which picking starts with a selected ink is found as the endpoint to characterize the pick resistance of the paper. In this group are the various proof press devices and techniques.

The third class of instruments uses a rotary type accelerating printing action rather than constant speed. With this acceleration, the behavior of the paper with a given standard ink is checked over a whole speed range in a single test. This feature eliminates the need to hunt for an endpoint through a series of tests and makes the test much more rapid. The improved pick tester of the present invention falls in this third group.

Probably the best known pick testing instrument of this third group is the one manufactured and sold by the Institute für Grafische Tecknik and generally known as the "IGT" pick tester. Briefly, it consists of a housing with a printing sector attached through the housing on a spindle to a pendulum which is used to move the printing sector with increasing speed. The inking apparatus consists of a separate three roll inking system which is necessary to supply ink for the inking disc. The inking disc when inked is placed on the housing and applies ink to a sample to be tested placed on the printing sector. The use of a separate inking system is time consuming and requires an expensive three roll inking system. The inking disc as presently used is subject to possible variations as to the thickness of the ink film to be applied on the printing sector making it difficult to obtain reproducible results.

This invention is an improvement on this device and by providing an integral inking assembly and a grooved inking disc, speedy, reproducible results can be obtained.

In the drawings:

FIG. 1 is a front view of a standard IGT pick tester, as modified, showing the novel inking assembly therefor in position.

FIG. 2 is a side view of the modified IGT tester with the novel inking assembly in inking position.

FIG. 3 is a cross-sectional view taken at line 3—3 of FIG. 1 showing the inking disc.

FIG. 4 is a partial perspective view showing the inking apparatus on the tester housing.

FIG. 5 is a cross-sectional view taken at line 5—5 of FIG. 1 showing the doctor blade lever arm attached to the tester housing.

The testing apparatus shown in FIG. 1, except for applicant's novel inking assembly, including the inking disc, is a standard IGT print tester designed and sold by the Stitchting Instituut voor Grafische Techniek T.N.O., Ter Gouwstraat 1, Amsterdam O, the Netherlands, and described in their information leaflets of May and September 1955. The operation of the IGT print tester is fully explained in the Manual of the I.G.T. Printability Tester, published May 1955.

The present invention comprises a novel inking assembly that is mounted on the IGT pick tester housing and replaces the inking disc formerly used with the tester.

The IGT pick tester with the improved inking apparatus as shown in FIG. 1 has a housing 20 and printing sector 22 in the shape of a sector of 150°. The printing sector 22 is covered with packing or an offset blanket 24 on which paper sample 26, about two centimeters wide, to be tested is placed and attached on the blanket by clamp 27. The sector 22 is attached to spindle 28 extending through the housing having attached at its other end a pendulum 30 with lever 32 holding the pendulum 30 in the up position ready for operation. Handle 33 as seen in FIG. 2 is used to raise the pendulum 30 and attached sector 22 to the up position. All of this print tester described above is conventional. The present improvement comprises the grooved inking disc 34 with a cylindrical surface two centimeters wide, crank element 36 with crank handle 38 attached in place, doctor blade arm 40 rotatably mounted on the housing 20 by means of shaft 42, doctor blade 44 removably mounted by a bolt 45 to the doctor blade arm 40 and having weight 46 mounted on the outer end of arm 40 to provide tension on doctor blade 44 when the arm 40 is in doctoring position. Inking disc 34 has groove 48 in its cylindrical surface 50. All parts are preferably hardened steel though stainless steel and other similar materials are satisfactory.

In the pick tester as shown acceleration of the printing sector 22 is provided by the weight of the pendulum 30. Another method of providing acceleration to the printing sector 22 is a spring drive device manufactured by IGT for use with its IGT pick tester. This spring drive is described in the aforementioned IGT information leaflet of May 1955. The spring drive device is used in place of the pendulum 30 and is easily attached to spindle 28. With this embodiment of the IGT pick tester a spring gives acceleration to the segment 22 and greater printing speeds may be achieved than with the pendulum.

As shown in FIG. 3 which is a sectional view taken at line 3—3 of FIG. 1, the inking disc 34 has a groove 48 which is approximately one centimeter wide in its cylindrical surface 50 with holes 52 and 54 bored in the disc body to accommodate the threaded pins 56 and 58, respectively, said pins 56 and 58 being threaded to crank element 36 as shown. Handle 38 is attached to crank element 36 at its threaded end. Inking disc 34 rotates on shaft 66 extending from the housing 20 when the inking assembly is operated.

Inking disc 34 has a circumferential groove 67 on its inner surface that is adapted to receive spring loaded pins 69 which have rounded heads, said pins 69 are forced by the spring load to extend into groove 67, thus locking the inking disc on the shaft. Other suitable means may be used to hold the inking disc 34 on the shaft 66.

FIG. 4 is a partial perspective view showing the doctor blade 44 in operating position. Doctor blade 44 is pressed radially against inking disc 34 with the weight 46 providing a force against the disc of approximately 15 pounds. The hole 49 in the doctor blade arm as shown in FIG. 5 is tapered from both sides so that the blade edge 68 is free to align with the cylindrical surfaces of inking disc 34. Doctor blade 44 is attached by a bolt 46 to doctor blade arm 40 and can be easily removed or turned. Doctor blade 44 has two identical edges 68 and 70 either of which may be used when the other becomes worn by simply turning the blade.

A groove 48 in inking disc 34, 0.00060 inch deep with a tolerace of 0.00002 inch, has been used with highly satisfactory results. The clearance of such a groove 48 under th doctor blade edge 68 is about 15 microns and the resulting film of ink when doctored is about 12 microns. A groove of such dimensions is so shallow as to be only difficultly seen with the naked eye. Of course, deeper grooves may be used but .0010 inch is the maximum depth that should be used. For extremely smooth papers a groove only as deep as .00025 inch may be used. However, .00060 inch is the preferred depth.

To operate the apparatus the sample 26 to be tested is mounted on printing sector 22 over blanket or packing 24 by attaching an end of the sample 26 to clamp 27. Crank element 36 is inserted into inking disc 34 with pins 56 and 58 engaging holes 52 and 54, respectively, of the inking disc. Doctor blade arm 40 is placed in position with doctor blade 44 pressed against inking disc 34. A small amount of standard testing ink is then placed in groove 48 with a spatula, said amount being at least enough to fill the groove and preferably some excess to obtain precise doctoring action. Inking disc 34 is then rotated two revolutions against doctor blade 44 by means of crank handle 38 and crank element 36. The crank element 36 is then removed by extracting the pins 56 and 58 from inking disc holes 52 and 54, respectively and doctor blade 44 is removed from contact with inking disc 34. The IGT tester is then operated in the standard manner by bringing the pendulum 30 or other acceleration means to the up position and then releasing it so that the printing sector 22 with the attached paper sample 26 will turn against inking disc 34. The test sample is then examined to determine the picking point.

During the test printing the paper strip is pressed against the full two centimeter width of the inking disc.

It may occur to some that printing from a recessed portion of the disc in this manner is really a gravure, rather than a letterpress type of test. Actually, however, the behavior observed here is identical with normal letterpress printing. The ink is in a continuous film on a smooth metal surface as in letterpress instead of in isolated minute cells or cups in a plate surface as in gravure. It should be pointed out that the printing pressure situation here is essentially the same on the inked and uninked portions of the disc surface. The groove depth of 0.6 mil is only 12% of the normal impression deformation of most paper samples and packing. With the groove 48 filled with ink to the usual 80% this difference is reduced from 12% to 2.4% which is not significant here. Thus, the operation of the IGT pick tester with applicant's novel inking assembly can be considered as letterpress printing producing a print one centimeter wide but with pressure distributed over the two centimeter width of the sample and printing disc surface 50.

The inking disc 34 is driven only by its contact with paper sample 26 on printing sector 22. In the operation of the IGT tester without the modified grooved inking disc and with the usual inking assembly, the force required to accelerate the inking disc had to be transmitted through the ink film by a tangential shear stress. This stress is not normal to letterpress printing and would tend to slur the print. The possibility that this stress might have an unusual effect of some sort on the ink behavior has been suggested. The novel inking disc constituting a part of the present invention has eliminated this possible effect by having direct contact between the paper and the metal surface 50 of the inking disc 34.

Applicant's inking system eliminates the possibilities of variation in the amount of ink applied to the sample with the precise metering of the inking assembly. Standard deviations between 7–11% have been obtained with applicant's inking assembly whereas deviations of the order of 25% are obtained with conventional or prior art devices.

Applicant's improved inking assembly greatly reduces the time necessary to run a test for the necessity of a long period of time to distribute ink on prior art inking discs is eliminated as is the extensive cleaning of the prior art roller inking systems.

It will be apparent to those familiar with the art that the device of the present invention is capable of numerous modifications without departing from the spirit of the invention. It is desired, therefore, not to limit the invention except as defined in the claims set forth below.

I claim:

1. In a pick tester having a housing, a sector rotatably mounted on said housing and means to rotate said sector on said housing, the improvement comprising an inking disc rotatably mounted on said housing and having a groove in its outer cylindrical surface, means to rotate said grooved inking disc, an elongated shaft attached to said housing, a doctor means rotatably attached to said shaft, the doctor means contacting the inking disc over the groove therein to accurately meter the amount of ink on said inking disc when the inking disc is rotated against it in operation.

2. In a pick tester having a housing, a sector rotatably mounted on said housing, a pendulum connected to said sector, the improvement comprising an inking disc having a groove in its clylindrical surface rotatably mounted on said housing, a crank element removably mounted on said inking disc, a crank handle attached to said crank element, a doctor blade in contact with the cylindrical surface of the inking disc, said doctor blade being removably attached to one end of a doctor blade lever arm, said doctor blade lever arm being rotatably attached to the housing by means of an elongated shaft, and a weight attached to the other end of the doctor blade lever arm to provide a force upon the doctor blade when the inking disc is rotated against it in operation.

References Cited in the file of this patent
UNITED STATES PATENTS

| | | |
|---|---|---|
| 1,939,814 | Hoch | Dec. 19, 1933 |
| 2,353,852 | Rowland et al. | July 18, 1944 |
| 2,705,424 | Pomper | Apr. 5, 1955 |
| 2,728,224 | Wheeler | Dec. 27, 1955 |
| 2,990,712 | Weber | July 4, 1961 |